United States Patent [19]

Gaines

[11] Patent Number: 4,494,335
[45] Date of Patent: Jan. 22, 1985

[54] "AUTOMATIC SET" MOLE TRAP

[76] Inventor: Henry F. Gaines, 6430 E. Berwyn St., Indianapolis, Ind. 46203

[21] Appl. No.: 471,165

[22] Filed: Mar. 1, 1983

[51] Int. Cl.³ .......................................... A01M 23/30
[52] U.S. Cl. ..................................................... 43/80
[58] Field of Search .......................... 43/80, 79, 78, 77

[56] References Cited

U.S. PATENT DOCUMENTS

| | | | |
|---|---|---|---|
| 689,324 | 12/1901 | Rittenhouse | 43/80 |
| 964,877 | 7/1910 | Nepean-Hutchison | 43/80 |
| 1,330,622 | 2/1920 | Corsaw | 43/80 |
| 1,382,125 | 6/1921 | Schroeter | 43/80 |
| 2,086,826 | 7/1937 | Smith | 43/80 |
| 2,249,332 | 7/1941 | Smith | 43/80 |
| 3,013,358 | 12/1961 | Wilken | 43/80 |

FOREIGN PATENT DOCUMENTS 2533096  2/1977  Fed. Rep. of Germany .......... 43/80

Primary Examiner—Gene P. Crosby
Attorney, Agent, or Firm—Henry F. Gaines

[57] ABSTRACT

A mole trap when properly set is first placed over the tunnel with side members on either side of the tunnel and plunger head in line with the tunnel. Downward pressure is applied until setting wings reach finished grade. Next the handle is raised until the trigger arm engages the plunger head and secures same until the trigger mechanism is activated.

1 Claim, 5 Drawing Figures

"AUTOMATIC SET" MOLE TRAP

SUMMARY OF THE INVENTION

This invention relates to a device for trapping and securing a mole until such time the mole may be removed from the lawn by caretaker or other responsible person.

Moles infest residential lawns, cemetaries, gardens, industrial landscaping, architectural landscaping and open areas of meadows. Moles tunnel beneath the surface of the earth in shallow narrow tunnels that leave a maze of raised earth and turf that is visible and awkward to mow, till or walk upon. Lawn and vegetation immediately above the tunnel are usually destroyed. Moles re-use the tunnels at various and frequent intervals in search of food.

It is therefore the object of this invention to provide a trap that embodies ease of operation, positive holding and safety to the operator and persons near the trap while it is in the "set" position.

DESCRIPTION OF PREFERRED EMBODIMENTS

Figure 1:
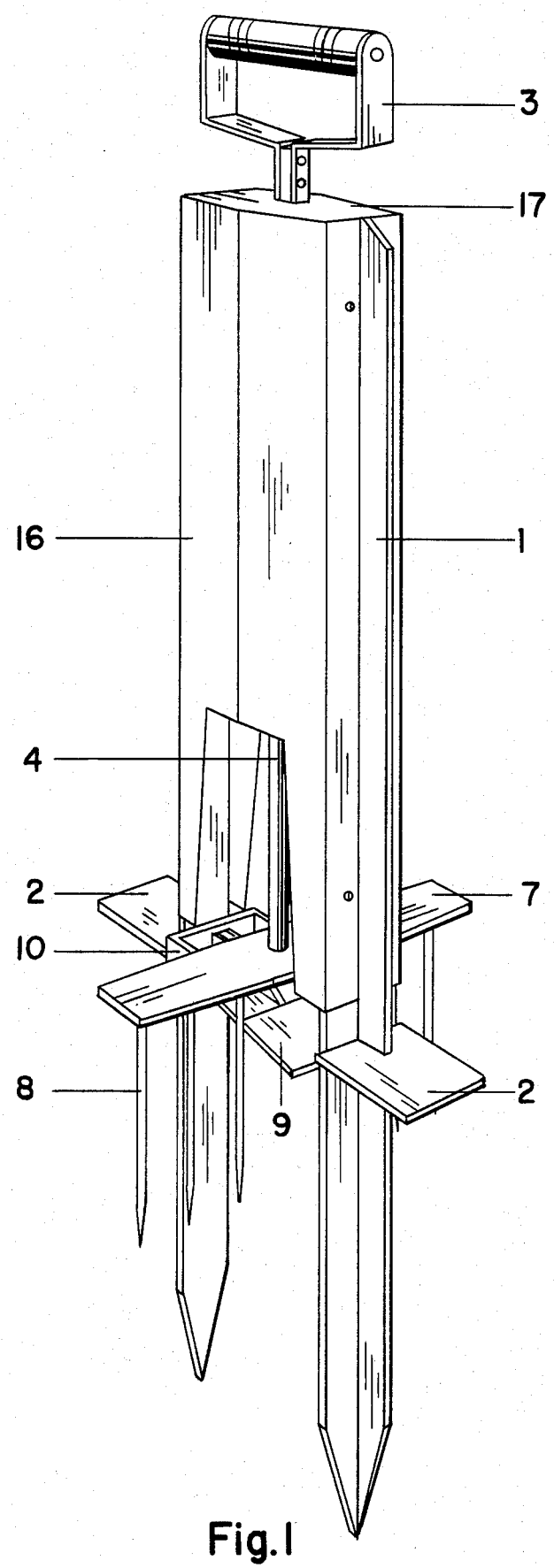
FIG. 1 is a front view or elevation of the "Automatic Set" Mole Trap embodying the present invention.
Figure 2:
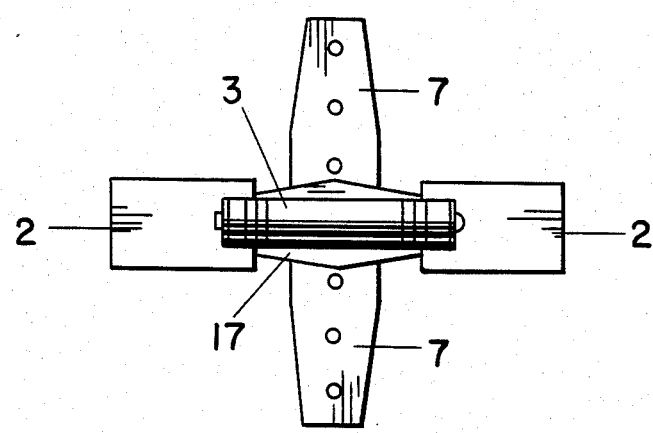
FIG. 2 is a plan view of the invention.
Figure 3:
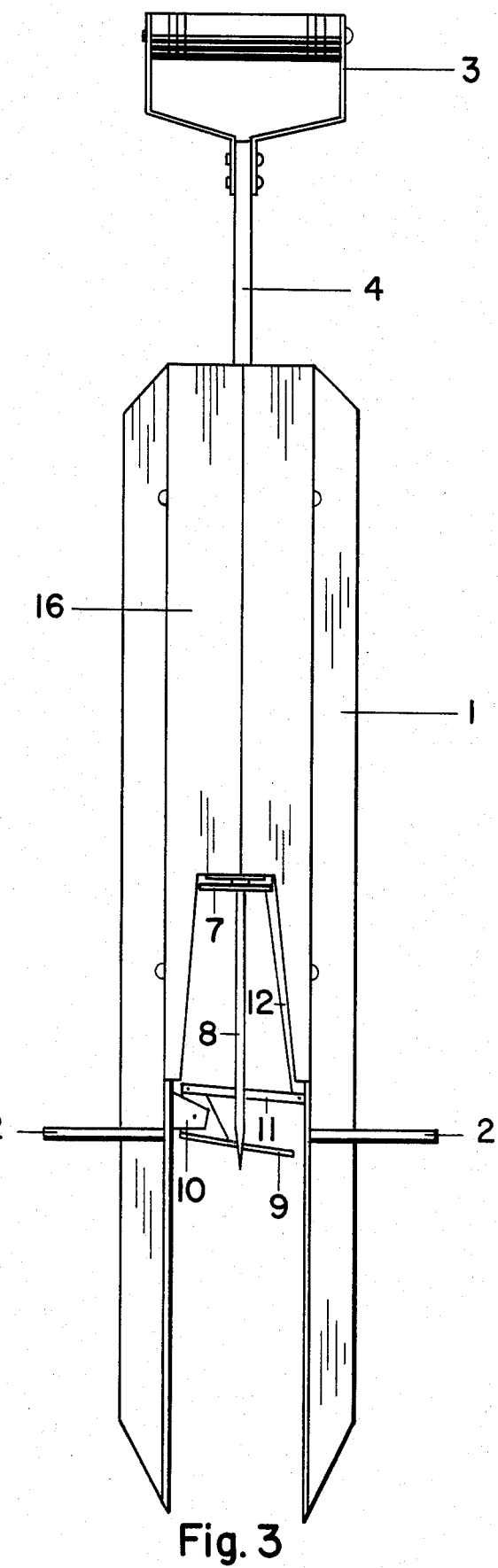
FIG. 3 is a front view or elevation of the invention. The back view or elevation is a mirrored view of FIG. 3.
Figure 4:
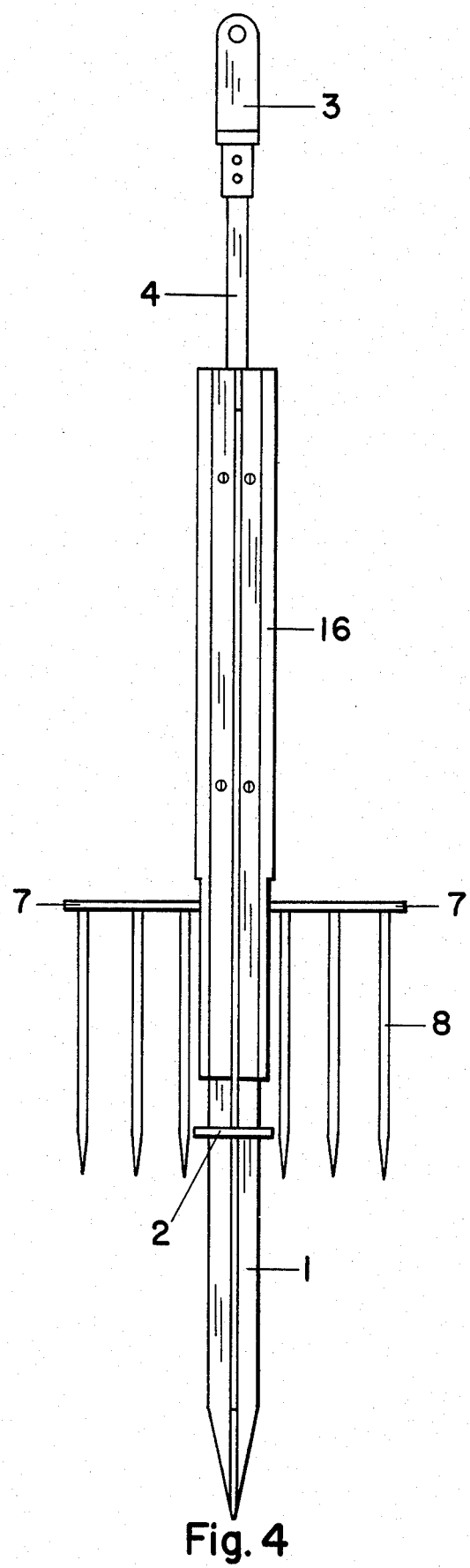
FIG. 4 is a right side view or elevation of the invention. The left side view or elevation is a mirrored view of FIG. 4.
Figure 5:
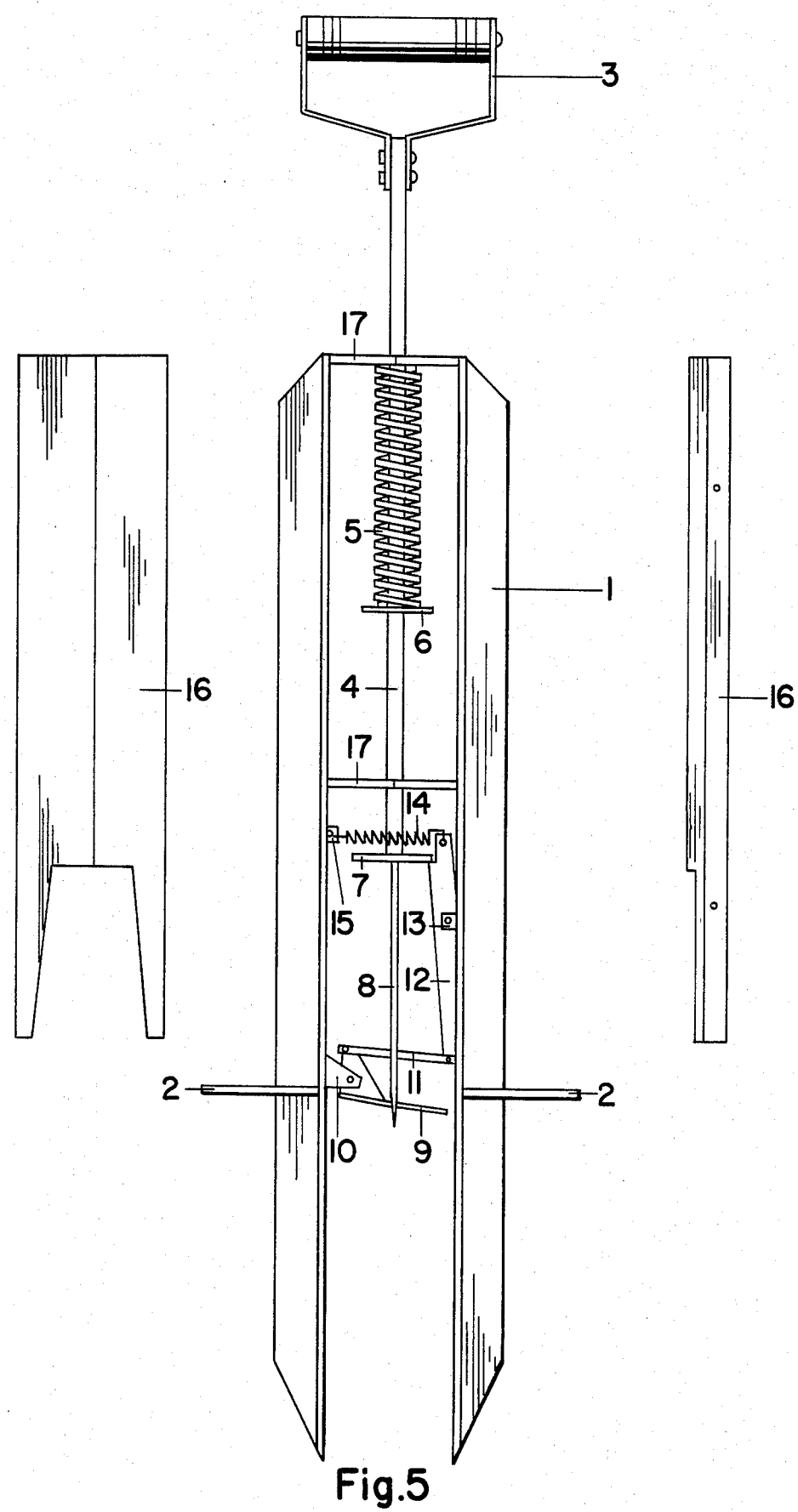
FIG. 5 is a front view or elevation of the invention with the protective shield removed to illustrate the operating mechanism.

For the purpose of understanding the Invention, reference will now be made to the embodiments illustrated in the drawings.

Operation of the trap is made safe, quick and accurate by the features embodied in the invention.
  a. Place the trap over the mole tunnel so that each frame member is immediately outside the tunnel and aligning the plunger assembly directly over the tunnel.
  b. Press downward until the leveling wings are at grade setting.
  c. Pull upward on handle until you hear the plunger assembly engage.

The "Automatic Set" Mole Trap is now set.

Referring now to the drawings and particularly to FIG. 1, there is illustrated the frame T member 1 which provides lateral stability when set to the proper depth assuring that the trap will remain in proper position throughout the setting period.

The leveling wings 2 insure the proper depth setting when set at grade level.

The Handle Assembly 3 provides an Automatic Set when raised upward to the set position.

The Trigger Mechanism is so connected that raising of the trigger 9 causes the trigger to pivot at the trigger bracket 10 and move the connector rod 11 away from the set position. As the connector rod 11 moves from the set position it also moves the arm 12 which pivots on the arm bracket 13 and moves from under the plunger assembly activating the plunger assembly. The setting spring 14 applies tension on the trigger arm 12 and pulls trigger arm 12 into the set position when trap is being activated.

The plunger assembly consists of the shaft 4 power spring 5 retainer 6 head 7 and spikes 8 and operates as a unit. When the plunger head 7 is released by the trigger arm 12 the plunger assembly moves quickly downward to pin the mole and hold until the trap and mole are released.

The protective shield 16 provides protection for persons near the trap while in the set position. The trap is often left unattended for a period of time and therefore protection from injury is provided by the protective shield 16.

I claim:

1. A mole trap for placement over a tunnel in soil, said trap comprising, a frame having two parallel side members connected by spacers, said side members having sharp pointed lower ends for insertion into the soil on either side of said tunnel, each side member having a T-shaped cross section for providing lateral stability and stability against forward or backward motion, one spacer being located at and connecting the top of the side members and a second spacer connecting the side members closer to the center of the length thereof; a leveling wing attached to each side member and extending from the side thereof for inserting and locating the trap in a position in relation to the grade level of the soil; a spring powered plunger slidably mounted for vertical movement through said spacers and having an in-line plunger head attached thereto, a plurality of spaced spikes attached thereto, a plurality of spaced spikes attached to said plunger head and aligned in side-by-side relationship with the direction of the tunnel; a trigger mechanism having a pivoted trigger located at said grade level, a trigger arm, a setting spring for automatically setting the trigger mechanism by biasing the trigger arm to engage and hold the plunger head when elevated to a set position, and a connecting rod between the trigger and said trigger arm for causing the trigger arm to release the plunger head upon actuation of the trigger by a mole traveling through said tunnel; and protective shields extending between the side member for enclosing the trigger mechanism for protection to persons near the trap particularly while the trap is in the set position.

* * * * *